United States Patent
Fontaine et al.

(10) Patent No.: US 10,412,672 B2
(45) Date of Patent: Sep. 10, 2019

(54) TECHNIQUE FOR MANAGING POWER USAGE IN A LOCAL COMMUNICATION NETWORK

(71) Applicant: Orange, Paris (FR)

(72) Inventors: Fabrice Fontaine, Geveze (FR); Han Yan, Puteaux (FR)

(73) Assignee: ORANGE, Paris (FR)

( * ) Notice: Subject to any disclaimer, the term of this patent is extended or adjusted under 35 U.S.C. 154(b) by 60 days.

(21) Appl. No.: 15/526,624

(22) PCT Filed: Nov. 13, 2015

(86) PCT No.: PCT/FR2015/053064
§ 371 (c)(1),
(2) Date: May 12, 2017

(87) PCT Pub. No.: WO2016/075416
PCT Pub. Date: May 19, 2016

(65) Prior Publication Data
US 2017/0347317 A1 Nov. 30, 2017

(30) Foreign Application Priority Data
Nov. 14, 2014 (FR) .................................... 14 61020

(51) Int. Cl.
*G06F 1/26* (2006.01)
*G06F 1/32* (2019.01)
(Continued)

(52) U.S. Cl.
CPC ........... *H04W 52/0219* (2013.01); *H02J 3/28* (2013.01); *H04L 12/2803* (2013.01);
(Continued)

(58) Field of Classification Search
None
See application file for complete search history.

(56) References Cited

U.S. PATENT DOCUMENTS

2010/0262312 A1 10/2010 Kubota et al.
2012/0229077 A1 9/2012 Tsuchiya
(Continued)

OTHER PUBLICATIONS

International Search Report dated Feb. 11, 2016 for corresponding International Application No. PCT/FR2015/053064, filed Nov. 13, 2015.
(Continued)

*Primary Examiner* — Nitin C Patel
(74) *Attorney, Agent, or Firm* — David D. Brush; Westman, Champlin & Koehler, P.A.

(57) ABSTRACT

A technique for managing power usage in a local communication network. The network includes at least one device having at least one operation phase. A processing unit receives information related to at least one operation phase of the device after detecting an operation phase change. The information includes power used by the device during the phase and an estimated duration of the phase. The processing unit determines projected power usage within the local network for the duration of the operation of the device, the projected power usage taking the form of at least one power usage increment and an associated increment duration. For a power usage increment, the processing unit: determines an output current to be output by at least one battery in order to at least partially compensate the increment; and sends, to the battery, a command to discharge the output current determined for the duration of the increment.

11 Claims, 3 Drawing Sheets

(51) Int. Cl.
| | |
|---|---|
| *H04W 52/02* | (2009.01) |
| *H02J 3/28* | (2006.01) |
| *H04L 12/28* | (2006.01) |
| *H02J 3/14* | (2006.01) |

(52) U.S. Cl.
CPC ... *H04W 52/0261* (2013.01); *H02J 2003/143* (2013.01); *H04L 2012/285* (2013.01); *Y02B 70/3266* (2013.01); *Y02D 70/00* (2018.01); *Y02D 70/142* (2018.01); *Y02D 70/168* (2018.01); *Y04S 20/242* (2013.01)

(56) References Cited

U.S. PATENT DOCUMENTS

| | | | |
|---|---|---|---|
| 2013/0099751 A1 | 4/2013 | Nishikawa et al. | |
| 2014/0214219 A1 | 7/2014 | Katayama et al. | |
| 2014/0333265 A1* | 11/2014 | Kinjo | G01R 31/3624 |
| | | | 320/134 |

OTHER PUBLICATIONS

Written Opinion of the International Searching Authority dated Feb. 11, 2016 for corresponding International Application No. PCT/FR2015/053064, filed Nov. 13, 2015.

English Translation of Written Opinion of the International Searching Authority dated Feb. 22, 2016, for corresponding International Application PCT/FR2015/053064, filed Nov. 13, 2015.

\* cited by examiner

TECHNIQUE FOR MANAGING POWER USAGE IN A LOCAL COMMUNICATION NETWORK

CROSS-REFERENCE TO RELATED APPLICATIONS

This Application is a Section 371 National Stage Application of International Application No. PCT/FR2015/053064, filed Nov. 13, 2015, the content of which is incorporated herein by reference in its entirety, and published as WO 2016/075416 on May 19, 2016, not in English.

FIELD OF THE DISCLOSURE

The present disclosure relates to energy optimization, and it relates more specifically to a technique for managing electrical power consumed by one or more domestic devices connected in a local communication network.

BACKGROUND OF THE DISCLOSURE

Usually, a household has numerous domestic devices that can consume significant electrical power, such as domestic electrical appliances like a dishwasher, a washing machine or even a clothes drier. Such devices consume electricity irregularly according to different phases of operation. Some phases of operation are thus high consumers compared to others and lead to a consumption peak. This phenomenon is amplified when a user decides to operate several domestic devices at the same time, the electrical consumption thereof being added together. Such simultaneous operation of several energy-intensive devices then produces a consumption peak, potentially significant if the phases of operation of the different machines operating maximize the power consumed at the same instant. Such a consumption peak is often observed at the start of the evening, when an individual returning from work launches phases of operation of one or more domestic electrical devices of his or her household.

Unfortunately, the same behavior can be observed in a majority of individuals. The domestic electrical consumption peaks described above are then observed in most households, which generates a national consumption peak for the energy provider. Such a peak can be very damaging if the total power drawn by the devices exceeds the instantaneous power that can be delivered on the network by the electricity production plants which are connected to it. There is then in fact a risk of the electrical network failing, leading to an electrical power supply outage of an entire region, even a national outage. In addition to the discomfort caused to the people affected, such an outage can be the cause of significant damage, and for example result in the death of people requiring emergency medical care, or even accidents caused by substitute heating or lighting means such as carbon monoxide poisoning or fires caused by candles or open fires.

A first existing solution for reducing such consumption peaks consists in urging the user of the domestic devices not to exceed a maximum electrical consumption, as the "Ecowatt" program does in France. Similarly, the user can be urged to consume more during days or periods of the day exhibiting low overall consumption, if necessary through more advantageous tariffs such as in the context of the EDF "peak times-off-peak times" and "Tempo" contracts in France. Nevertheless, if such a solution relies primarily on the goodwill of the user, its results are very random and may require an action on the part of the user.

Other solutions limit the electrical power that can be drawn in a restrictive way, for example by imposing a consumption threshold value not to be exceeded. Such a limitation may be accompanied by a list of priority domestic devices and enforce the switching off of the non-priority devices over predefined time bands or else if this threshold value is exceeded. Nevertheless, such solutions can considerably degrade the performance levels of the devices and therefore the user experience, for example if a device is switched off abruptly right in the middle of a washing cycle.

SUMMARY

According to a first aspect, the subject of the invention is a method for managing electrical consumption in a local communication network, comprising at least one device, the operation of said device exhibiting at least one phase of operation. The method comprises the following steps implemented by a data processing unit:
  reception from the device of information relating to at least one phase of operation of the device, the information relating to a phase of operation comprising a power consumed by said device during this phase and an estimated duration of said phase;
  determination of a projected power consumption in the local network for the duration of the operation of said device in the form of at least one consumption level and of an associated level duration;
  obtention of a value of current electrical charge available in the local network by means of at least one battery;
  for a consumption level, determination of an output current to be delivered by said at least one battery to at least partly compensate said level and sending of a command to discharge the determined output current for the duration of said level to said at least one battery.

The consumption in the local network can have one or more consumption levels, higher or lower. These consumption levels depend on the use of the devices in the local network.

The phase of operation for which information is sent by the device corresponds to a current or future phase of operation. The device has this information in real time, this information depending on the technical specifications of the device, on actions of programing and/or of interaction of a user on the device, on local parameters measured by the device (for example, for a washing machine: weight of the washing, water or air temperature, how dirty the washing is, etc.).

Such a management method thus makes it possible to smooth the electrical consumption in a local network without requiring actions on the part of the user or degrading the quality of the services provided by the device or devices of the local network. One or more consumption levels can thus be compensated in the local network. It is thus possible to limit the consumption peaks which can occur on the network of an energy provider.

The different embodiments or features mentioned hereinbelow can be added independently or in combination with one another, to the steps of the management method as defined previously.

In a particular embodiment, the reception of the information relating to a phase of operation of a device is implemented following a detection of a change of phase of operation of the device.

A change of a phase of operation corresponds for example to the starting up of a new phase of operation or even to the pausing of a phase of operation by the user.

This allows the processing unit to keep the consumption projections updated following the occurrence of an event and thus the level of discharge drawn from the battery or batteries present in the local network. The consumption smoothing performance levels are thus improved.

In a particular embodiment, the change of phase of operation of the device is detected following reception of a notification from the device. The device notifies the processing unit of any change of phase of operation, which thus makes it possible to adapt the battery discharge level according to this change.

In order to take into account the updates of the projected consumption produced by a device during a phase of operation, the reception of the information relating to a phase of operation of the device is implemented repeatedly. The level of discharge drawn from the battery or batteries present in the local network can thus be adapted.

In a particular embodiment, a step of charging of the battery is implemented following the execution of the discharge command. This makes it possible to use periods during which the electrical consumption is low to recharge the battery or batteries and to smooth the electrical consumption in the local network over time. The battery or batteries can be recharged from the network of the energy provider. The battery or batteries can also be associated with a renewable energy system, for example using solar panels or wind turbines. Such battery charging in effect offers an economical benefit for the user of the local network.

In a particular embodiment, the compensated consumption level is associated with a simultaneous use of a plurality of domestic devices of the local network. The use of several devices simultaneously causes high consumption levels which should preferably be compensated.

In a particular embodiment, the steps of determination of an output current to be delivered and of sending of a discharge command are executed for a plurality of consumption levels, until the battery is completely discharged. This makes it possible to make best use of the resources available in the local network and to smooth the electrical consumption in the local network over time.

In a particular embodiment, the method further comprises a step of identification of a consumption level to be compensated by comparison between two successive consumption levels.

According to a second aspect, the invention relates to a processing unit, which can be connected to a local communication network, said local network comprising at least one device, the operation of said device exhibiting at least one phase of operation. This processing unit comprises:
- a module for detecting a change of phase of operation of said at least one device of the local network;
- a module for receiving information relating to at least one phase of operation of a device of the local network from the device, the information relating to a phase of operation comprising a power consumed by said device during this phase and an estimated duration of said phase;
- a module for obtaining a value of current electrical charge available in the local network by means of at least one battery;
- a determination module, arranged to determine a projected power consumption in the local network for the duration of the operation of said device in the form of at least one consumption level and of an associated level duration and, for a consumption level, an output current to be delivered by said at least one battery to at least partly compensate said level;
- a module for sending a command to discharge the determined output current for the duration of said level to said at least one battery.

The advantages stated for the management method according to the first aspect can be transposed directly to the processing unit.

According to a third aspect, the invention relates to a gateway comprising a data processing unit according to the second aspect.

According to a fourth aspect, the invention relates to a system for managing electrical consumption in a local communication network, comprising at least one device, the operation of said device exhibiting at least one phase of operation, at least one battery, arranged to receive a discharge command comprising an output current to be delivered and to execute said command, and a processing unit according to the second aspect.

The advantages stated for the management method according to the first aspect can be transposed directly to the system.

According to a fifth aspect, the invention relates to a program for a processing unit, comprising program code instructions intended to control the execution of the steps of the management method according to the first aspect, when this program is run by the processing unit and a storage medium that can be read by a processing unit on which is stored a program for a unit.

The advantages stated for the management method according to the first aspect can be transposed directly to the program for a processing unit and to the storage medium.

BRIEF DESCRIPTION OF THE DRAWINGS

Other features and advantages of the management technique will become apparent on reading the following description of an embodiment. This description is given with reference to the attached drawings in which.

DETAILED DESCRIPTION OF ILLUSTRATIVE EMBODIMENTS

Figure 1:
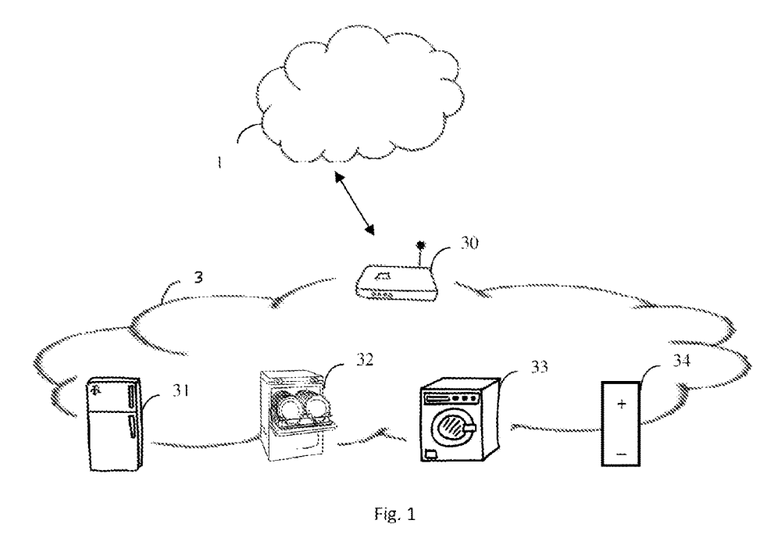
FIG. 1 represents a system for managing electrical consumption in a local network according to a particular embodiment.

FIG. 1 represents, in its environment, a system for managing electrical consumption in a local communication network 3.

A local communication network should be understood to be a network of LAN (Local Area Network) type. This network can in particular be a domestic network or an enterprise network. An access gateway 30 allows devices of the local network 3 to access a wide area network 1 or WAN, such as the internet network.

The local network can be either a wired network of Ethernet type, according to the IEEE 802.3 standard, or a wireless network of Wi-Fi, according to the IEEE 802.11 standard, or 3G type, or even a combination of the two. The link can be direct, or use an intermediate device such as CPL units.

The gateway 30 of the local network 3 is by definition the core of a local communication network. The devices of the local network can be a TV decoder or "Set-Top-Box", a mobile terminal such as a smartphone, or a tablet. In the context of a home automation network, there are also domestic electrical devices or appliances, alarm systems, sensors.

Once connected to an access point, the devices of the local network can thus receive data from the other devices of the local network or else from devices connected to the wide area network and send data to a device of the local network or connected to the wide area network.

Context of management of electrical consumption in the local network is assumed hereinbelow.

FIG. 1 shows domestic devices 31-33. For example, these domestic devices are domestic electrical appliances such as a refrigerator 31, a dishwasher 32, a drier, a washing machine 33, a freezer, etc. There is no limitation on the type of these domestic devices. They can be any kind of device of the local network having a wired or wireless network connection.

These devices exhibit, in their operation, one or more phases of operation.

Figure 2A:
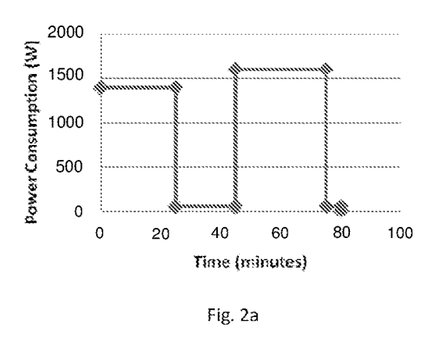
FIGS. 2a, 2b respectively illustrate the different phases of operation of a dishwasher and of a washing machine

As a first example, and as illustrated in FIG. 2*a*, the dishwasher 32 has a first washing phase, a pause phase, a second washing phase and a drying phase. As a second example and as illustrated in FIG. 2*b*, the washing machine 33 has a washing phase followed by a spinning phase.

For each phase of operation of a device of the local network there can be an associated power consumed, such as the maximum power consumed, by this device during this phase. In a variant, each phase can have associated with it the average power consumed by this device. Each phase of operation of a device can also have a phase duration associated with it.

Thus, as a first example and as illustrated in FIG. 2*a*, the dishwasher 32 can have a first phase of operation during a first wash with a duration of 25 minutes with a consumed power of 1400 watts, a second phase of operation with a duration of 20 minutes with a consumed power of 50 watts corresponding to a pause phase, a third phase of operation corresponding to a second washing phase with a duration of 30 minutes and a consumed power of 1600 watts and a fourth phase of operation corresponding to a drying phase with a duration of 5 minutes with a consumed power of 50 watts.

Figure 2B:
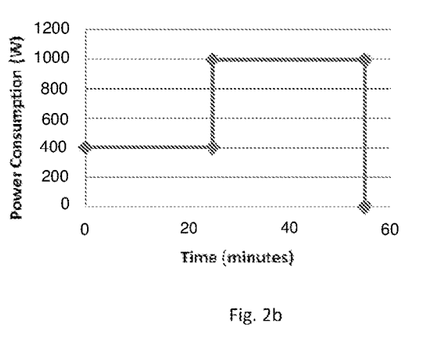

As a second example and as illustrated in FIG. 2*b*, the washing machine 33 can have a first phase of operation corresponding to a washing phase with a duration of 25 minutes with a consumed power of 400 watts and a second phase of operation corresponding to a spinning phase with a duration of 30 minutes with a consumed power of 1000 watts.

A battery 34, capable of being discharged on command from a control device, is also connected to the local network 3. In a particular embodiment, the battery 34 is also capable of being charged on command from a control device. The battery 34 can be recharged from the network of the energy provider. The battery 34 can also be associated with a renewable energy system, for example using solar panels or wind turbines. Such battery charging in effect offers an economic benefit for the user of the local network.

It is also recalled that the local network represented in FIG. 1 corresponds to an exemplary embodiment. There is no limitation on the number of devices, of batteries, or on their type.

The system also comprises a data processing unit 300, not represented in FIG. 1, which can be connected to the local network 3 and configured to manage the electrical consumption in the local network 3. The data processing unit can be incorporated in a dedicated device, or else in one of the devices of the local network 3, in particular in the gateway 30 of the network.

The access gateway 30, because of its central role in the local network, can notably drive the execution of the method, by acting as the battery 34 control device. In effect, all the devices of the local network 3 are linked to it and, through its routing function, it communicates with these devices. The access gateway 30 controls the local network 3, and therefore naturally has a position of coordinator. Furthermore, because of its function of access to the wide area network 1, it is generally in permanent operation. It also generally already has sufficient processing means to carry out the operations performed by the data processing unit. It is thus able to manage the electrical consumption in the local network.

In another embodiment, the processing unit 300 is incorporated in the digital TV set-top-box.

In another embodiment, the data processing unit 300 is incorporated in a device external to the local network, such as a device of a service provider, for example a device of the electricity provider for the user of the local network.

To manage the electrical consumption in the local network, the data processing unit 300 first of all obtains information relating to one or more phases of operation of the devices of the local network. It is stressed here that the management method can be implemented for one or more devices of the local network. It is not necessary for all the devices of the local network to supply the information relating to their phases of operation. The management method can in fact make it possible to smooth the electrical consumption for a single device.

These devices are switched on by the user and their operation will run through one or more phases potentially each exhibiting a different electrical consumption. The information obtained by the processing unit and relating to a phase of operation for one of these devices notably comprises a projected consumption by the device during this phase. The projected consumption corresponds to a power consumed during this phase.

The processing unit 300 then determines an output current to be delivered by the battery 34 in order to compensate all or part of the power consumed by one or more devices during a time interval based on the information acquired. This time interval corresponds to the duration of a phase of operation for a single device or else to a part of a phase of operation of a device when several devices are currently be used. Thus, at the local network level, different phases are observed, corresponding to consumption levels, for which it is possible to determine the projected power consumption and the associated level duration. Only the consumption levels at the local network level exhibiting a high value compared to other levels are thus compensated. These levels correspond to consumption peaks in the local network. As an illustrative example, a consumption level to be compensated can be identified iteratively by comparison between two successive consumption levels. It is also possible to identify a given number of levels by descending order of power value, the identified levels then corresponding to consumption peaks. The consumption peaks can also correspond to consumption levels for which the consumed power is above a threshold value. It will be understood that there are many methods that make it possible to identify consumption levels to be compensated without there being a need to identify them here exhaustively.

The processing unit 300 then sends to the battery a command to discharge the determined output current for the duration corresponding to the consumption level, to compensate all or part of the selected consumption level.

When the battery 34 has executed the discharge command, it is once again set to charge. In a particular embodiment, the processing unit sends a charge command to the battery 34.

Thus, from the point of view of the electricity provider, the electrical consumption in the local network 3 is smoothed and certain consumption levels associated with high power values (or consumption peaks) are compensated.

Figure 2C:
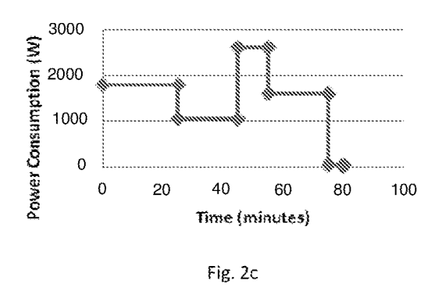
FIG. 2c illustrates the electrical consumption resulting from a simultaneous use of these two devices.

As illustrated in FIG. 2c, corresponding to a simultaneous use of the dishwasher 32 and of the washing machine 33, there are thus observed a first consumption level with a duration of 25 minutes with a consumed power of 1800 watts, a second consumption level with a duration of 20 minutes with a consumed power of 1050 watts, a third consumption level with a duration of 10 minutes with a consumed power of 2600 watts, a fourth consumption level with a duration of 20 minutes with a consumed power of 1600 watts and a fifth consumption level with a duration of 5 minutes with a consumed power of 50 watts.

The processing unit determines for example that the consumption is high during the third consumption level and commands the battery to contribute to the electrical power supply of the local network by discharging. In another exemplary embodiment, the processing unit can also smooth the consumption during the first consumption level. Different embodiments are thus possible in order to smooth all or part of the consumption levels in the local network.

The management method is executed autonomously. No action is required from the user. As an example, the user does not have to decide to delay switching on his or her dishwasher. The user also does not have to list priority devices. Furthermore, the devices of the local network are not modified because of the implementation of the management method. There is no powering down of a device. The efficiency of these devices is thus optimum. The recharging of the battery is performed during periods, for which the electrical consumption in the local network is less high. When the battery is associated with a renewable energy system, its charging is performed transparently for the electricity provider. No modification of electrical consumption is thus made during periods corresponding to low consumption in the local network.

In a particular embodiment, at the network level, the exchanges between the processing unit 300 and the devices 31-34 of the local network 3 conform to the UPnP (Universal Plug and Play) network protocol promulgated by the UPnP forum. The aim of the UPnP standard is to allow devices to connect easily and communicate simply within such a network. It constitutes a set of communication protocols based on the IP protocol (Internet Protocol, the basic protocol for networks of internet type). To control the devices of the network, the UPnP protocol uses control points. The processing unit then acts as UPnP control point and interacts with the devices of the local network through UPnP services and actions proposed by those devices. Conventionally, a control point transmits, to the different devices of the local network, so-called discovery messages in order to obtain in return a description of the devices corresponding to the request. These discovery messages are transmitted more often than not in point-to-multipoint communication mode, also called multicast mode, from the control point to the devices. A device compatible with the UPnP standard responds to these request messages, and additionally transmits, at regular frequency, presence messages to signal that it is active and connected to the network.

In the embodiment described, the devices 31-33 implement a UPnP service, hereinafter called "Appliance", to share with the processing unit information relating to their phases of operation. This service comprises the following three actions:

GetPowerConsumption to obtain the instantaneous consumption of a device;

GetListOfCycles to obtain the consumption and the projected duration of each of the future phases of operation of a device;

GetCurrentCycleInfo to obtain information on the status of the current phase of operation of a device (started up, paused, stopped, startup forced by the user, etc.) and the time remaining to finish the current phase.

In the embodiment described, the battery 34 implements a UPnP service, hereinafter called "Battery", comprising the following actions:

GetCurrentChargeInfo to obtain the current electrical charge of the battery (in W/h or mAh), its maximum electrical charge (in W/h or mAh), its maximum discharge current (in mA);

DeliverCharge to ask the battery to deliver its electrical charge. This action comprises, as parameter, the output current expressed in amperes and the discharge duration. In effect, the discharge current conditions how long the battery can last. For example, a 2000 mAh battery can deliver 2 amperes for one hour, 4 amperes for 30 minutes or 1 ampere for two hours.

In a particular embodiment, the "battery" service also comprises a StartCharge action to start the charging of the battery (and thus to stop the discharging thereof).

Figure 5:
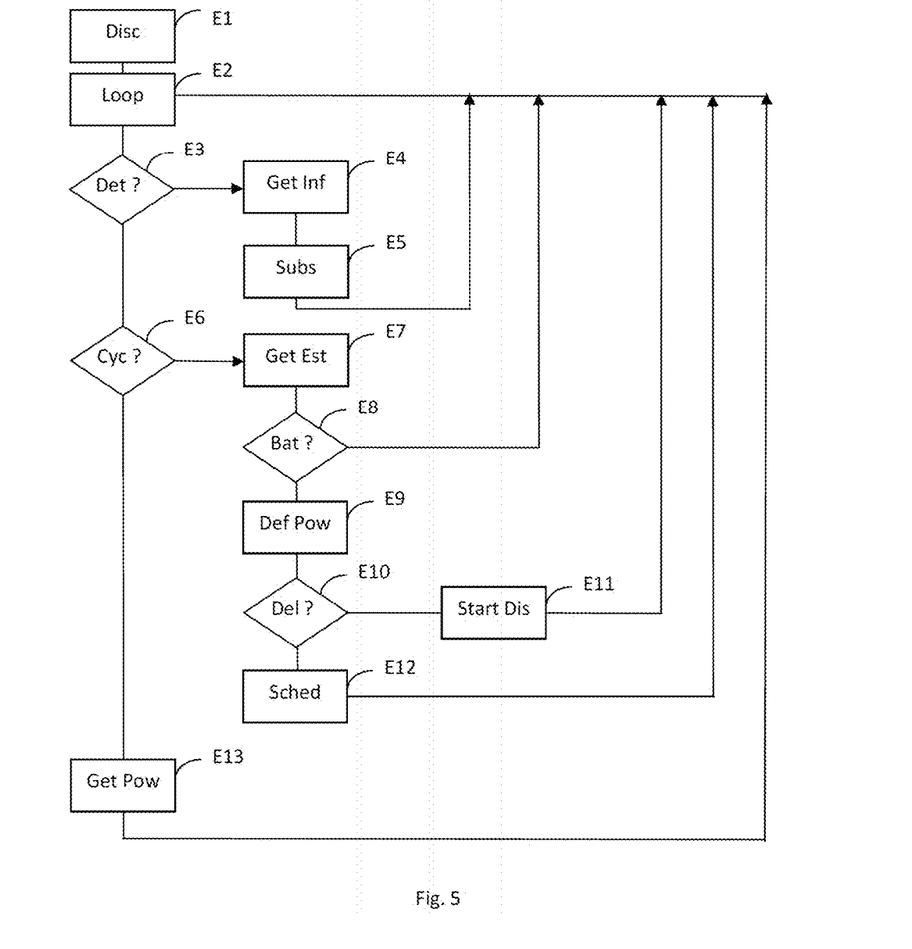
FIG. 5 is a diagram schematically representing an implementation of a method for managing electrical consumption in a local network according to a particular embodiment.

There now follows a description, in relation to FIG. 5, of the management technique in a particular embodiment.

In a discovery step E1, the processing unit 300 implements a process of discovery of the domestic devices 31-33 connected to the local network and of battery or batteries available in the local network.

For this, in a first variant implementation, the processing unit 300 can receive messages sent by each domestic device and by each battery upon their connection to the local network LAN, for example when they are powered up, or for a domestic device, when a phase of operation is launched by a user. Such a message can comprise a URL address making it possible to access an XML file comprising static data making it possible to give a description of the domestic device. The messages exchanged between the processing unit 300 and the domestic devices 31 -33 conform to the UPnP protocol. These different devices implement the "Appliance" service described previously. The messages exchanged between the processing unit 300 and the battery 34 conform to the UPnP protocol. The processing unit and the battery implement the "battery" service described previously. The SSDP protocol makes it possible to discover services offered on a network, such as the "Appliance" service and the "Battery" service. The SSDP protocol is defined by the IETF in a document draft-cai-ssdp-v1-03.txt "Simple Service Discovery Protocol/1.0 Operating without an Arbiter" dated October 1999.

These messages can be SSDP "alive" messages sent to a multicast address by the domestic devices for the "Appliance" service and by the battery 34 for the "Battery" service. Example of Notification Message Sent by a Domestic Device to Advertize the Presence of the "Appliance" Service:

```
NOTIFY * HTTP/1.1
HOST: 239.255.255.250:1900
CACHE-CONTROL: max-age = seconds until advertisement expires
LOCATION: URL for UPnP description for root device
NT: urn:schemas-upnp-org:service:appliance:1
NTS: ssdp:alive
SERVER: OS/version UPnP/1.0 product/version
USN: advertisement UUID
```

Example of Notification Message Sent by a Battery to Advertize the Presence of the "Battery" Service:

```
NOTIFY * HTTP/1.1
HOST: 239.255.255.250:1900
CACHE-CONTROL: max-age = seconds until advertisement expires
LOCATION: URL for UPnP description for root device
NT: urn:schemas-upnp-org:service:battery:1
NTS: ssdp:alive
SERVER: OS/version UPnP/1.0 product/version
USN: advertisement UUID
```

In a second variant implementation, the processing unit 300 can itself initiate a process of discovery of the domestic devices offering the "Appliance" service. The same applies for the "Battery" service. Such a process can be initiated upon the connection of the processing unit to the network in order to detect the devices already connected to it, more particularly in the case where the devices remain connected to the network permanently once powered up. The processing unit then sends a request message over the network, for example of the "M-SEARCH request" type.

Example of Request Message Sent by the Processing Unit to Detect the Presence of the "Appliance" Service:

```
M-SEARCH * HTTP/1.1
HOST: 239.255.255.250:1900
MAN: "ssdp:discover"
MX: seconds to delay response
ST: urn:schemas-upnp-org:service:appliance:1
```

Examples of Request Message Sent by the Processing Unit to Detect the Presence of the "Battery" Service:

```
M-SEARCH * HTTP/1.1
HOST: 239.255.255.250:1900
MAN: "ssdp:discover"
MX: seconds to delay response
ST: urn:schemas-upnp-org:service:battery:1
```

In response to these requests, the devices offering these services are identified with the processing unit by transmitting to it notification messages as described previously.

In a step E2, the processing unit is waiting for a timer (main loop) to time out. This timer is for example of the order of five seconds.

In a detection step E3, the processing unit determines whether a new device has been detected. More specifically, the processing unit determines whether it has received an SSDP "alive" message.

If such is the case, in a step of obtaining static data E4, the processing unit obtains static data supplied by the newly discovered domestic device 31-33 or battery 34. The processing unit can access these data in the form of an HTML file by means of the URL address included in the message transmitted by the domestic device or the battery.

These static data give a description of a device and can include a serial number, the name of the manufacturer, the model of the device, a device type, a software version, etc. This enables the processing unit to keep up to date an inventory of the devices connected to the local network and likely to consume energy.

Example of HTML File that can be Accessed from the URL Address Contained in the "Alive" Message Transmitted by a Washing Machine:

```
<?xml version="1.0"?>
<root xmlns="urn:schemas-upnp-org:device-1-0">
  <specVersion>
    <major>1</major>
    <minor>0</minor>
  </specVersion>
  <device>
    <deviceType>urn:schemas-upnp-org:device:Washer:1</deviceType>
    <friendlyName>My Washer</friendlyName>
    <manufacturer>Grunding</manufacturer>
    <modelName>model name</modelName>
    <modelNumber>model number</modelNumber>
    <modelURL>URL to model site</modelURL>
    <serialNumber>manufacturer's serial number</serialNumber>
    <UDN>uuid:UUID</UDN>
    <serviceList>
      <service>
        <serviceType>urn:schemas-upnp-org:service:Appliance:1
        </serviceType>
        <serviceId>urn:upnp-org:serviceId:Appliance1</serviceId>
        <SCPDURL>URL to service description</SCPDURL>
        <controlURL>URL for control</controlURL>
        <eventSubURL>URL for eventing</eventSubURL>
      </service>
    </serviceList>
  </device>
</root>
```

In a registration step E5, the processing unit can send to each new domestic device 31-33 discovered a subscription message in order for this device to notify the processing unit 300 in the future of the events concerning it such as the startup, the pausing or the end of a phase of operation. The startup, pausing or end of a phase are in effect particular instants during which there is a risk of the consumed power changing and after which the device concerned can update its estimation of the future cycle durations and consumption. The knowledge of these events by the processing unit is therefore necessary for the latter to be able to keep its consumption projections up to date and try to smooth the consumption as much as possible.

Such a subscription message can contain a response address of URL type to which the domestic device must send its notification messages to alert the processing unit of the occurrence of an event.

Example of Subscription Message:

```
SUBSCRIBE publisher path HTTP/1.1
HOST: publisher host:publisher port
CALLBACK: <delivery URL>
NT: upnp:event
TIMEOUT: Second-requested subscription duration
```

These steps E1 to E5 allow the processing unit to have a knowledge of the devices connected to the network. With regard to the domestic devices 31-33, the processing unit asks to be warned of the changes of phase of operation of these devices. The processing unit then once again implements the step E2 (main loop).

When, in the step E3, no new device has been detected, in step E6 of event detection, the processing unit 300 determines that a change of phase of operation has occurred, that is to say that a new phase of operation has started on a domestic device or that the user has paused one of the phases of operation. The processing unit 300 can make this determination on reception of a notification message sent by the domestic device itself.

Example of Notification Message of GENA Type Sent by a Domestic Device:

```
NOTIFY delivery path HTTP/1.1
HOST: delivery host:delivery port
CONTENT-TYPE: text/xml
CONTENT-LENGTH: Bytes in body
NT: upnp:event
NTS: upnp:propchange
SID: uuid:subscription-UUID
SEQ: event key
<?xml version="1.0"?>
<e:propertyset xmlns:e="urn:schemas-upnp-org:event-1-0">
<e:property>
<CycleStatus>STARTED_BY_USER</CycleStatus>
</e:property>
</e:propertyset>
```

The processing unit receives this notification message following the subscription performed in the step E5 or else following an interrogation through the GetCurrentCycleInfo action of the "Appliance" service.

During a step of obtaining phase information E7, the processing unit obtains information relating to one or more phases of operation of a domestic device after the startup of a new phase of operation on the latter or the pausing of a phase of operation, such a startup or pausing being determined by the processing unit in the step E6. For this, the processing unit interrogates a domestic device for which it has determined the startup of a new phase of operation of a pausing by the user in the step E6 and obtains or receives in return the information requested from the device. For each of its phases of operation, the domestic device 31-33 can indicate the power consumed during this phase and an estimated duration of this phase. In the context of an implementation through the UPnP protocol, such an interrogation can be performed through the GetListOfCycle action of the "Appliance" service described previously. This allows the processing unit to have the information necessary to estimate the consumption level or levels and any smoothing thereof.

During a step E8, the processing unit determines whether a battery 34 is available. If such is not the case, the processing unit then once again implements the step E2.

Otherwise, that is to say if at least one battery 34 is available, the processing unit determines, in a step E9, a program of usage of the electrical charge of the battery or batteries to compensate one or more consumption levels in the local network. This usage program notably comprises an identification of a battery, an output current to be delivered, a start-of-discharge instant and a discharge duration. This usage program is determined by taking into account the device or devices in operation, their respective phases of operation and the powers consumed in these phases of operation. Thus, the usage program is determined according to a projected consumed power in the local network for the duration of the operation of the device or devices in the form of a consumption level and of an associated level duration.

In a step E10, the processing unit detects, according to the usage program, whether the start of discharge is immediate. If such is the case, in a step E11, the processing unit sends a discharge command to the battery identified through a DeliverCharge action of the "Battery" service described previously.

If such is not the case, that is to say that the start of discharge is at a later date, in a step E12, the processing unit programs the discharge command at the start-of-discharge instant.

In both cases, the processing then once again implements the step E2.

When, in step E6 no new phase of operation or pausing has been detected, the processing unit obtains, in a step E13 for one or more domestic devices, an instantaneous consumption, information on the status of the current phase of operation thereof and the time remaining to finish the current phase. These data are obtained through GetPowerConsumption and GetListOfCycles actions of the "Appliance" service described previously. Still in this step E13, the processing unit obtains a current electrical charge of the battery 34. This datum is obtained through a GetCurrentChargeInfo action of the "Battery" service.

This obtention or reception repeated over time enables the processing unit to update the information previously acquired relating to the phases of operation of a device of the local network. The latter can in fact update, during a phase of operation, its estimation of the duration of this phase and of the electrical consumption during this phase. For example, during a washing phase of a washing machine, the cold water whose temperature can vary from one washing phase to another must first of all be heated up and the duration as well as the estimated power consumption for this washing phase can be updated by the washing machine once the water temperature required for the washing is reached. The battery usage program can then be updated according to this new information. Such repeated obtention can also enable the processing unit to plot histograms tracking the consumption of each domestic device. These histograms can then be displayed for the user. The processing unit then once again implements the step E2.

The presence in the local network of at least one battery thus makes it possible to absorb consumption peaks produced by one or more domestic devices. The processing unit can then smooth the electrical consumption in the local network.

Figure 6:
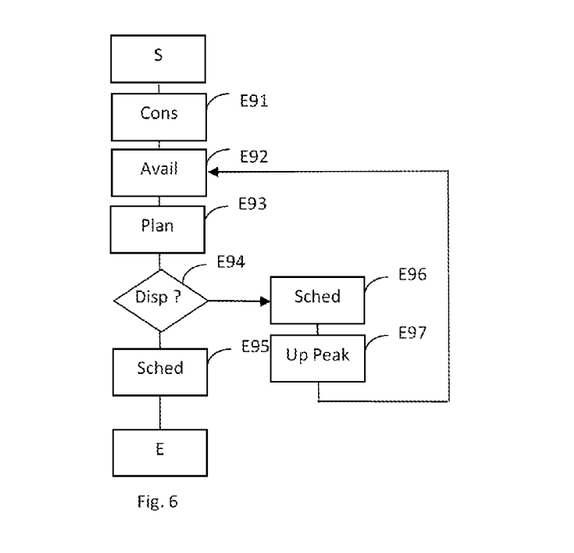
FIG. 6 is a diagram schematically representing an implementation of a determination step of a battery usage program according to a particular embodiment.

An implementation of the step E9, during the usage program of the electrical charge of the battery or batteries is determined, will now be described in relation to FIG. 6. A usage program notably comprises an identification of a battery, an output current to be delivered, a start-of-discharge instant and a discharge duration. It is stressed here that it is only an example of implementation of this step E9 and that there are many other possibilities without them being described exhaustively.

In a step E91, the processing unit determines, from the information relating to phases of operation of one or more domestic devices, obtained in the step of obtaining phase information E7, a projected consumed power. More specifically, the processing unit determines, according to the domestic devices currently in use, successive consumption levels and associated level durations. Out of the set of the consumption levels, the processing unit can then select one or more levels to be compensated. As an illustrative example, the processing unit selects a number N of consumption levels for which the consumed power is maximum. Still as an illustrative example, the processing unit selects one or more consumption levels for which the consumed power exceeds a threshold value. The current consumption level corresponds to the first consumption level selected.

In a step E92, the processing unit determines a value of electrical charge available in the local network, that is to say by means of the battery or batteries 34, from information obtained in the step E13 and, if appropriate, of discharges programed to handle preceding consumption levels.

In a step E93, for a current consumption level, the processing unit determines what power W is necessary and for what duration. The power W corresponds for example to the power of a consumption level. It can also be the difference between the power needed for the current consumption level and that needed for a next consumption level. It can also be the difference between the power of the level and a power threshold value.

In a step E94, the processing unit checks whether the electrical charge available in the UPnP battery or batteries is sufficient.

If such is not the case, in a step E95, the processing unit determines a usage program for the UPnP battery or batteries. This usage program corresponds to a discharge of the UPnP battery or batteries equal to the electrical charge available. With the local network no longer having energy resources, the step E9 is terminated.

Otherwise, that is to say when the electrical charge available in the UPnP battery or batteries is sufficient, in a step E96, the processing unit determines a usage program for the UPnP battery or batteries. This usage program corresponds to a discharge of the UPnP battery or batteries equal to an output current and for the duration of the consumption level.

In a step E97, if there are still consumption levels to be processed, the next consumption level becomes the current consumption level and the electrical charge available in the UPnP battery or batteries is updated to take account of the programed discharge. The step E92 is once again implemented.

The step E9 is terminated when all the consumption levels to be compensated have been processed.

Different examples of implementation of the method for managing electrical consumption in the local network will now be described in support of FIGS. 3a, 3b, 3c and 3d for a system comprising a dishwasher and a washing machine, the different phases of operation of which have been described previously in relation to FIGS. 2a and 2b. An embodiment is assumed in which the processing unit is incorporated in the access gateway 30.

In the step E4, the access gateway 30 obtains the static data from the washing machine 33. In the step E5, the access gateway 30 sends a washing machine subscription message in order for the latter to notify it of the events that relate to it, for example, when the user Fabrice starts, pauses or stops his washing machine. Fabrice also has UPnP batteries which are recharged by solar/wind turbine energy or by the mains. Fabrice decides to start his washing machine. The washing machine is the only domestic device active in the local network. The washing machine starts normally for a program of 55 minutes. It is assumed here that no consumption smoothing is implemented when only one device is in operation. Fabrice then starts up his dishwasher 32. Two domestic devices are thus active in the local network. From the consumption cycles of these devices, the access gateway 30 detects that a consumption level will occur with a consumption of 2600 watts for 10 minutes as represented in FIG. 2c. This consumption level represents a current of 11.8 amperes. The access gateway identifies, in the step E8, that the battery 34 is available with a charge of 1800 mAh. This battery 34 can thus supply a discharge current of 10.8 amperes for 10 minutes.

Figure 3A:
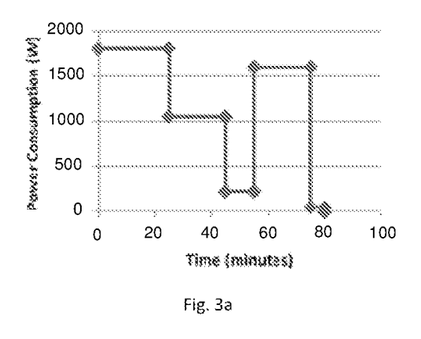
FIGS. 3a, 3b, 3c and 3d illustrate an implementation of a method for managing electrical consumption in a local network for a system comprising a dishwasher and a washing machine.

Consequently, the access gateway 30 decides to discharge the battery 34 with an output current of 10.8 amperes during the highest consumption level, in order to compensate the latter. The electrical consumption in the local network is represented in FIG. 3a. This shows the first consumption level with a duration of 25 minutes with a consumed power of 1800 watts, the second consumption level with a duration of 20 minutes with a consumed power of 1050 watts, the third consumption level with a duration of 10 minutes with a consumed power of 200 watts, the fourth consumption level with a duration of 20 minutes with a consumed power of 1600 watts and the fifth consumption level with a duration of 5 minutes with a consumed power of 50 watts. The highest consumption level in the local network following the execution of the discharge command is thus 1800 watts for 25 minutes. Following this command, the battery 34 is completely discharged.

Similarly, the highest consumption level has been reduced by 800 watts, that is to say 30 per cent, with no user configuration; the latter has not had to specify a delayed start, a threshold or a list of priority devices. The domestic devices have not been stopped abruptly by powering down. Furthermore, when the user decides to pause or even stop a device, the access gateway 30 is notified thereof and can then immediately adapt or modify the battery discharge.

Figure 3B:
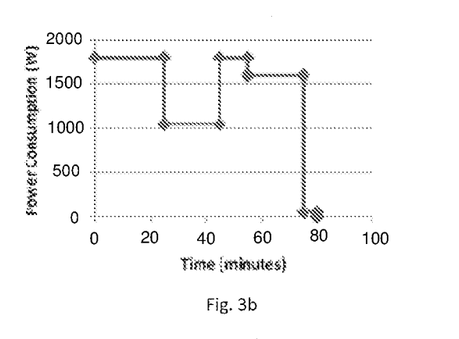

In another exemplary embodiment, represented in FIG. 3b, the access gateway 30 determines the power associated with the preceding consumption level (i.e. 1800 watts) and seeks only to absorb the difference between the two consumption levels. Thus, in the preceding example, if the access gateway detects that the first level is at 1800 watts and that the second level is at 2600 watts, it commands the battery to inject an output current of 3.7 amperes for 10 minutes in order to absorb only 800 W. Following this smoothing, the charge of the battery is 1183 mAh. FIG. 3b thus shows the first consumption level with a duration of 25 minutes with a consumed power of 1800 watts, the second consumption level with a duration of 20 minutes with a consumed power of 1000 watts, the third consumption level with a duration of 10 minutes with a consumed power of 1800 watts, the fourth consumption level with a duration of 20 minutes with a consumed power of 1600 watts and the fifth consumption level with a duration of 5 minutes with a consumed power of 50 watts. In this way, the consumption is adjusted to 1800 W for 10 minutes during the third consumption level.

Figure 3C:
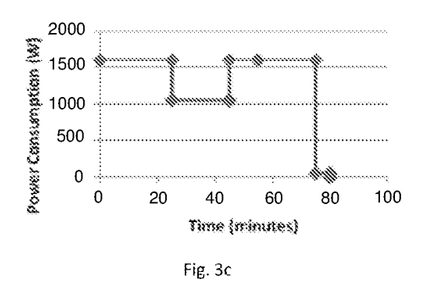

In another exemplary embodiment, represented in FIG. 3c, the access gateway can also decide to smooth the consumption to a value of 1600 watts corresponding to the value of the next consumption level. FIG. 3c then shows the first consumption level with a duration of 25 minutes with a consumed power of 1600 watts, the second consumption level with a duration of 20 minutes with a consumed power of 1000 watts, the third and fourth consumption levels with a duration of 30 minutes with a consumed power of 1600 watts, and the fifth consumption level with a duration of 5 minutes with a consumed power of 50 watts.

The battery 34 then discharges an additional 200 watts during the first and third consumption levels, i.e. 35 minutes, which corresponds to a discharge current of 0.91 amperes for 35 minutes. Following this discharge, there are still 652 mAh available in the battery. In this example, the highest consumption level following the execution of the discharge commands is 1600 watts for 55 minutes.

Figure 3D:
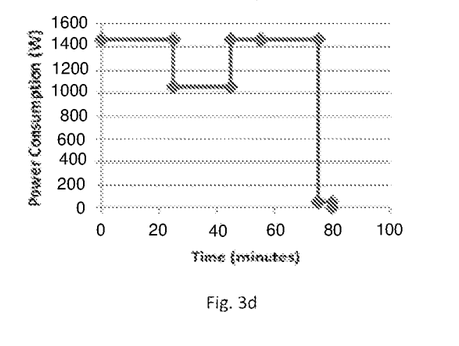

In another exemplary embodiment, represented in FIG. 3d, the access gateway can also decide to smooth the electrical consumption to a value corresponding to a complete discharge of the battery 34. Thus, the consumption can be adjusted to a value of 1468 watts. FIG. 3d then shows the first consumption level with a duration of 25 minutes with a consumed power of 1468 watts, the second consumption level with a duration of 20 minutes with a consumed power of 1000 watts, the third and fourth consumption levels with a duration of 30 minutes with a consumed power of 1468 watts and the fifth consumption level with a duration of 5 minutes with a consumed power of 50 watts.

In a particular embodiment, the energy provider can define a consumption threshold not to be exceeded. It is then possible to trigger the implementation of the management method when the power of certain consumption levels is close to this threshold, for example of the order of 75 percent of the threshold value.

In another particular embodiment, the energy provider can define peak hours and off-peak hours. It is then possible to trigger the implementation of the management method only during the peak hours.

Figure 4:
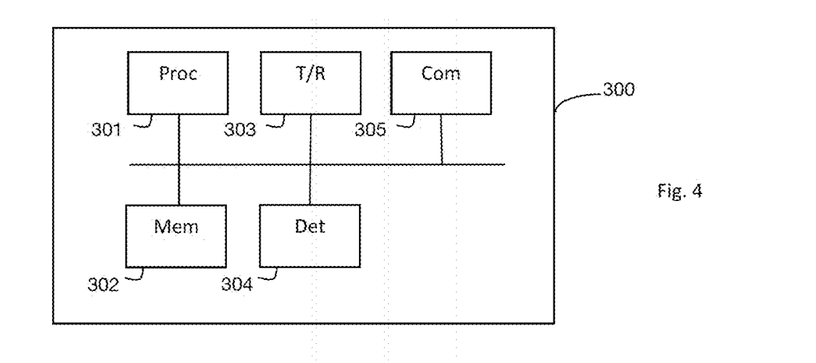
FIG. 4 schematically represents a processing unit according to a particular embodiment.

There now follows a description with reference to FIG. 4 of a processing unit 300. It notably comprises:
- a memory area 302, arranged to store a program which comprises code instructions for implementing the steps of the management method, as described previously;
- a processor 301 for executing the code instructions of software modules;
- a transmission/reception module 303, arranged to communicate with the devices of the local network;
- a determination module 304, arranged to determine a projected power consumption in the local network for the duration of the operation of said device in the form of at least one consumption level and of an associated level duration, and, for a consumption level, an output current to be delivered by said at least one battery to at least partly compensate said level;
- a module 305 for communication with the devices of the local network.

The communication module 305 is notably arranged to obtain (or receive) information relating to at least one phase of operation for a device of the local network 31-33, the information relating to a phase of operation comprising a power consumed by said device during this phase and an estimated duration of said phase, to obtain a current electrical charge value available in the local network by means of a battery 34 and to send a command to discharge the determined output current for the duration of said level to at least one battery. In a particular embodiment, the communication module 305 is also arranged to detect a change of phase of operation of a device of the local network.

In a particular embodiment, the communication module 305 implements the UPnP protocol to communicate with the devices of the local network.

In a particular embodiment, the processing unit 300 is incorporated in the access gateway 30. In this case, some modules are common.

The management technique is implemented by means of software and/or hardware components. Given that, the term "module" can correspond in this document equally to a software component, to a hardware component or to a set of hardware and/or software components, capable of implementing a function or set of functions, according to what is described previously for the module concerned.

A software component corresponds to one or more computer programs, one or more subprograms of a program, or, more generally, to any element of a program or of a software. Such a software component is stored in memory then loaded and run by a data processor of a physical entity and is capable of accessing the hardware resources of this physical entity (memories, storage media, communication bus, input/output electronic boards, user interfaces, etc.).

Similarly, a hardware component corresponds to any element of a hardware assembly. It can be a programmable or non-programmable hardware component, with or without integrated processor for software execution. It can for example be an integrated circuit, a chip card, an electronic card for executing firmware, etc.

In a particular embodiment, the modules 304, 305 are arranged to implement the management method described previously. Preferably, it takes the form of a software module comprising software instructions for having the steps of the management method described previously executed, implemented by a processing unit. The invention therefore relates also to:
- a program for a processing unit, comprising program code insructions intended to control the execution of the management steps described previously, when said program is run by this processing unit;
- a storage medium that can be read by a processing unit on which the program for a unit is stored.

The software modules can be stored in or transmitted by a data medium. The latter can be a hardware storage medium, for example a CD-ROM, a magnetic storage medium, for example a magnetic diskette or a hard disk. Also, the data medium can be a transmission medium such as an electrical, optical or wireless signal, which can be routed via an electrical or optical cable, wirelessly or by other means. The program code instructions can in particular be downloaded over a network of internet type.

Alternatively, the data medium can be an integrated circuit in which the program is incorporated, the circuit being adapted to execute or to be used in the execution of the management method described previously.

The invention also relates to a system for managing electrical consumption in a local network 3, comprising at least one device 31-33, the operation of said device exhibiting at least one phase of operation, at least one battery 34, arranged to receive a discharge command including an output current to be delivered and to execute said command, and a processing unit 300 as described previously.

An exemplary embodiment of the present disclosure remedies the inadequacies/drawbacks of the prior art and/or to provide improvements thereto.

Although the present disclosure has been described with reference to one or more examples, workers skilled in the art will recognize that changes may be made in form and detail without departing from the scope of the disclosure and/or the appended claims.

The invention claimed is:

1. A method for managing electrical consumption in a local communication network, comprising at least one device, wherein operation of said at least one device exhibits at least one phase of operation, said method comprising the following acts implemented by a data processing unit:
   detecting a change of phase of operation of said at least one device of the local network;
   receiving from the device information relating to at least one phase of operation of the device, the information relating to a phase of operation comprising a power consumed by said at least one device during this phase and an estimated duration of said phase;
   determining a projected power consumption in the local network for the duration of the operation of said at least one device in the form of at least one consumption level and of an associated level duration;
   obtaining a value of current electrical charge available in the local network by at least one battery; and
   for the at least one consumption level, determining an output current to be delivered by said at least one battery to at least partly compensate said level and sending a command to discharge the determined output current for the duration of said level to said at least one battery.

2. The method as claimed in claim 1, in which the change of phase of operation of the at least one device is detected following reception of a notification from the at least one device.

3. The method as claimed in claim 1, in which the act of receiving the information relating to a phase of operation of the at least one device is implemented repeatedly.

4. The method as claimed in claim 1, further comprising an act of charging the battery implemented following execution of the command to discharge.

5. The method as claimed in claim 1, in which the compensated consumption level is associated with a simultaneous use of a plurality of domestic devices of the local network.

6. The method as claimed in claim 1, in which the acts of determining an output current to be delivered and sending a command to discharge are executed for a plurality of consumption levels, until the battery is completely discharged.

7. The method as claimed in claim 1, comprising an act of identifying a consumption level to be compensated by comparison between two successive consumption levels.

8. A processing unit, which can be connected to a local communication network, said local network comprising at least one device, wherein operation of said at least one device exhibits at least one phase of operation, said processing unit comprising:
   a non-transitory computer-readable medium comprising instructions stored thereon; and
   a processor configured by the instructions to perform acts comprising:
   detecting a change of phase of operation of said at least one device of the local network ;
   receiving from said at least one device information relating to at least one phase of operation of the at least one device, the information relating to a phase of operation comprising a power consumed by said at least one device during this phase and an estimated duration of said phase;
   obtaining a value of current electrical charge available in the local network by at least one battery;
   determining a projected power consumption in the local network for the duration of the operation of said at least one device in the form of at least one consumption level and of an associated level duration and, for a consumption level, an output current to be delivered by said at least one battery to at least partly compensate said level; and
   sending a command to discharge the determined output current for the duration of said level to said at least one battery.

9. An access gateway comprising:
   a processing unit as claimed in claim 8, which is further configured by the instructions to enable the at least one device of the local communication network to access a wide area network and to manage managing electrical consumption in the local communication network; and
   a transmitter/receiver configured to communicate with the at least one device of the local communication network.

10. A system comprising:
    the processing unit as claimed in claim 8,
    the at least one device, and
    the at least one battery, arranged to receive the command to discharge comprising the output current to be delivered and to execute said command to discharge,
    wherein the processing unit, the at least one device and the at least one battery are connected through the local communication network.

11. A non-transitory computer-readable storage medium comprising program code instructions stored thereon and controlling execution of a managing electrical consumption in a local communication network by a processing unit, when said program is run by said processing unit, wherein the local network comprises at least one device, wherein operation of said device exhibits at least one phase of operation, said method comprising the following acts implemented by the processing unit:
    detecting a change of phase of operation of said at least one device of the local network;
    receiving from the said at least device information relating to at least one phase of operation of the at least one device, the information relating to a phase of operation comprising a power consumed by said at least one device during this phase and an estimated duration of said phase;
    determining a projected power consumption in the local network for the duration of the operation of said at least one device in the form of at least one consumption level and of an associated level duration;
    obtaining a value of current electrical charge available in the local network by at least one battery; and
    for a consumption level, determining an output current to be delivered by said at least one battery to at least partly compensate said level and sending a command to discharge the determined output current for the duration of said level to said at least one battery.

* * * * *

UNITED STATES PATENT AND TRADEMARK OFFICE
CERTIFICATE OF CORRECTION

PATENT NO. : 10,412,672 B2
APPLICATION NO. : 15/526624
DATED : September 10, 2019
INVENTOR(S) : Fabrice Fontaine and Han Yan

Page 1 of 1

It is certified that error appears in the above-identified patent and that said Letters Patent is hereby corrected as shown below:

In the Claims

Column 18, Line 45, in Claim 11, after "least", insert --one--.

Signed and Sealed this
Seventh Day of July, 2020

Andrei Iancu
*Director of the United States Patent and Trademark Office*